United States Patent [19]

Bongaerts et al.

[11] Patent Number: 5,705,886
[45] Date of Patent: Jan. 6, 1998

[54] CATHODE FOR PLASMA ADDRESSED LIQUID CRYSTAL DISPLAY

[75] Inventors: Petrus Franciscus Gerardus Bongaerts, Waalre; Jacob Bruinink, Eindhoven; Adrianus Leonardus Josephus Burgmans, Eindhoven; Henri Roger Jules Richard Van Helleputte, Eindhoven; Babar Ali Khan, Ossining; Karel Elbert Kuijk, Dommelen, all of Netherlands; Thomas Stanley Buzak; Kevin John Ilcisin, both of Beaverton, Oreg.; Paul Christopher Martin, Vancouver, Wash.

[73] Assignees: Philips Electronics North America Corp., Tarrytown, N.Y.; Tektronix, Inc., Wilsonville, Oreg.

[21] Appl. No.: 361,079

[22] Filed: Dec. 21, 1994

[51] Int. Cl.$^6$ .................................. H01J 17/49
[52] U.S. Cl. .................................. 313/483; 313/584
[58] Field of Search .................. 313/483, 581, 313/517, 582, 584, 484, 491, 633; 315/169.4; 345/60, 87

[56] References Cited

U.S. PATENT DOCUMENTS

| | | | |
|---|---|---|---|
| 4,896,149 | 1/1990 | Buzak et al. | 340/794 |
| 5,073,743 | 12/1991 | Kajiwara et al. | 313/582 |
| 5,077,553 | 12/1991 | Buzak | 340/794 |
| 5,141,460 | 8/1992 | Jaskie et al. | 445/24 |
| 5,272,472 | 12/1993 | Buzak | 345/60 |
| 5,276,384 | 1/1994 | Martin | 313/582 |
| 5,311,204 | 5/1994 | Nishida | 313/484 |
| 5,453,660 | 9/1995 | Martin et al. | 313/582 |
| 5,455,489 | 10/1995 | Bhargava | 313/468 |
| 5,536,193 | 7/1996 | Kumar . | |

FOREIGN PATENT DOCUMENTS

| | | |
|---|---|---|
| 0523494 | 1/1993 | European Pat. Off. . |
| 0545569A1 | 6/1993 | European Pat. Off. . |
| 0628944A1 | 12/1994 | European Pat. Off. . |

OTHER PUBLICATIONS

F.J. Himpsel et al, Phys. Rev. vol. 20, No. 2, 15th Jul. 1979, pp. 624–626, "Quantum photoyield of diamond (III)–A stable negative–affinity emitter".

Nalin Kumar et al, IEEE Collogium on "Diamond in Electronics and Optics", Digest No. 1993/204, 1993. p. 9/1.

C. Wang et al, Electronics Letters, 1st Aug. 1991, vol. 27, No. 16, pp. 1459–1461, "Cold Field emission from CVD Diamond films observed in emission electron microscopy".

N.S. Xu et al, Electronics Letters, 2nd Sep. 1993, vol. 29, No. 18, "Field–dependence of the Area–Density of cold electron emission sites on broad–area CVD Diamond films", pp. 1596–1597.

M.C. Benjamin et al, Applied Physics Letters 64 (24), 13 Jun. 1994, pp. 3288–3290, "Observation of a negative electron affinity for heteroepitaxial AlN on $\alpha$(6H)–SiC(0001)".

Buzak et al, "A 16–Inch Full Color Plasma Addressed Liquid Crystal Display" Digest of Tech. Papers. 1993 SID Int. Symp. Soc. for Info. Displ. pp. 883–886.

Primary Examiner—Sandra L. O'Shea
Attorney, Agent, or Firm—John C. Fox

[57] ABSTRACT

A plasma-addressed electro-optic display device having a layer of electro-optic material, data electrodes coupled to the electro-optic layer and adapted to receive data voltages for activating portions of the electro-optic layer, and a plurality of plasma channels extending generally transverse to the data electrodes for selectively switching on the electro-optic portions. The plasma channels each contain spaced elongated cathode and anode plasma electrodes and an ionizable gas filling. To improve performance, reliability and lifetime of the device, at least the cathode electrodes have surface portions of a negative electron affinity material. Preferably, the negative electron affinity material is a film of conductive or semiconductive diamond, diamond-like carbon, or aluminum nitride.

6 Claims, 2 Drawing Sheets

CATHODE FOR PLASMA ADDRESSED LIQUID CRYSTAL DISPLAY

BACKGROUND OF INVENTION

This invention relates to plasma-addressed electro-optic display panels commonly referred to as "PALC" display devices. These devices comprise, typically, a sandwich of: a first substrate having deposited on it parallel transparent column electrodes, commonly referred to as "ITO" columns or electrodes since indium-tin oxides are typically used, on which is deposited a color filter layer; a second substrate comprising parallel sealed plasma channels corresponding to rows of the display crossing all of the ITO columns each of which is filled with a low pressure ionizable gas, such as helium, and containing spaced cathode and anode electrodes along the channel for ionizing the gas to create a plasma, which channels are closed off by a thin transparent insulator; and an electro-optic material, such as a liquid crystal (LC) material, located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionzed channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of each LC pixel to backlight or incident light is a function of the stored voltage across the pixel. A more detailed description is unnecessary because the construction, fabrication, and operation of such PALC devices have been described in detail in the following U.S. patents and publication, the contents of which are hereby incorporated by reference: U.S. Pat. Nos. 4,896,149; 5,077,553; 5,272,472; 5,276,384; and Buzak et al., "A 16-Inch Full Color Plasma Addressed Liquid Crystal Display", Digest of Tech. Papers, 1993 SID Int. Symp., Soc. for Info. Displ. pp. 883-886.

The ideal plasma channel would allow the plasma to be established over the entire length of the channel in a short time (plasma formation time) and at low voltages. At the same time, the ideal channel would allow the plasma to be maintained for a certain time, after the ionizing voltage has been switched off, in a sufficiently conductive state so as to allow time for the pixel capacitance to charge up to the data signal voltage to be acquired by the liquid crystal pixel (data setup and capture time). After this time, the plasma must become non-conducting after a certain time (plasma decay time), so that the pixel voltage does not change after the data line is switched off. According to the present state of the technology, the ideal case would require the plasma to be established over the length of the channel and remain in enough of a conducting state to allow the data to be written on the LC pixels in less than one-half the maximum available row address time. After that the plasma must become non-conducting. This allows the rest of the line time to be used for available crosstalk reduction techniques.

The present state of the an uses Cr/Cu/Cr electrodes coated with a layer of $LaB_6$ or $GdB_6$. The present gas fill uses pure helium as the plasma gas. With this arrangement, the plasma can be switched on within 3 µs by applying 350V between the anode and the cathode electrodes within the plasma channel. However, the plasma remains in a conductive state much longer (18 µs) than is required. This results in degradation of the signal on the LC pixel and does not allow time for the use of crosstalk reduction techniques. This can be improved by using gas mixtures that have more suitable decay times such as He—Ne. However, the electrode sputtering during the plasma state worsens with this and other gas mixtures and the lifetime of the display panel degrades.

SUMMARY OF INVENTION

An object of the invention is an improved PALC display device.

A further object of the invention is a PALC display device having improved performance, reliability and lifetime.

Another object of the invention is a PALC display device exhibiting reduced ignition voltage and having electrodes more resistant to sputtering.

In accordance with a first aspect of the invention, a PALC display devices comprises in the plasma channel at least on the cathode electrode a surface of a negative electron affinity (NEA) material, which means that the conduction energy band in the surface material is sufficiently close to the vacuum energy level, within 5 kT of energy, that it allows the surface to emit electrons at relatively low electric fields. In effect, the presence of an NEA surface on the cathode electrode results m a lowered ignition voltage. Moreover, electron emission will be higher for a given voltage resulting in establishment of a uniform plasma in a shorter time.

In accordance with a preferred embodiment of the invention, the plasma cathode electrode comprises a conductive substrate coated with a thin film of a hard refractory NEA material that is sufficiently conductive to support electron emission. A preferred refractory NEA material is diamond or diamond-like carbon (DLC).

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

Figure 1:
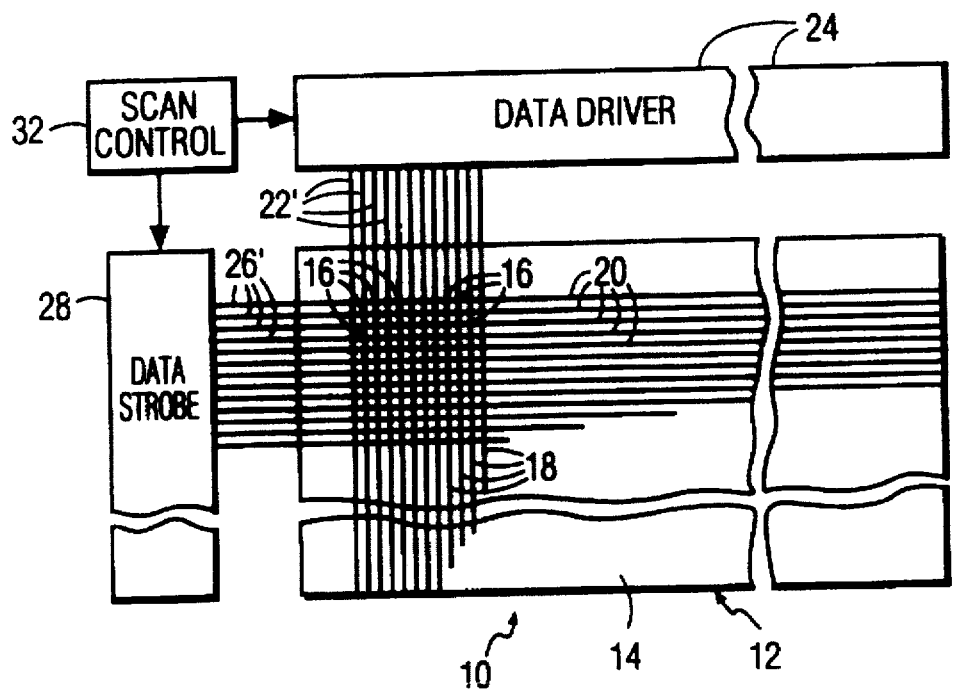
FIG. 1 is a schematic block diagram of a conventional flat panel display system.

FIG. 1 shows a flat panel display system 10, which represents a typical PALC display device and the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34, and the channel rows are usually built into a second transparent substrate 36. Skilled persons will appreciate that certain systems, such as reflective display of either the direct view or projection type, would require that only one substrate be optically transparent.

Column electrodes 18 receive data drive signals of the analog voltage type developed on parallel output conductors 22' by different ones of output amplifiers 23 (FIG. 2) of a data driver or drive drive circuit 24, and channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential, such as ground, common to each channel 20 and data strobe 28 is applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as electro-optic materials. As LC materials are presently the most common example, the detailed description will refer to LC materials but it will be understood that the invention is not limited thereto. A color filter (not shown) may be positioned within display panel 12 to develop multi-colored images of controllable color intensity. For a projection display, color can also be achieved by using three separate monochrome panels 12, each of which controls one primary color.

Figure 2:
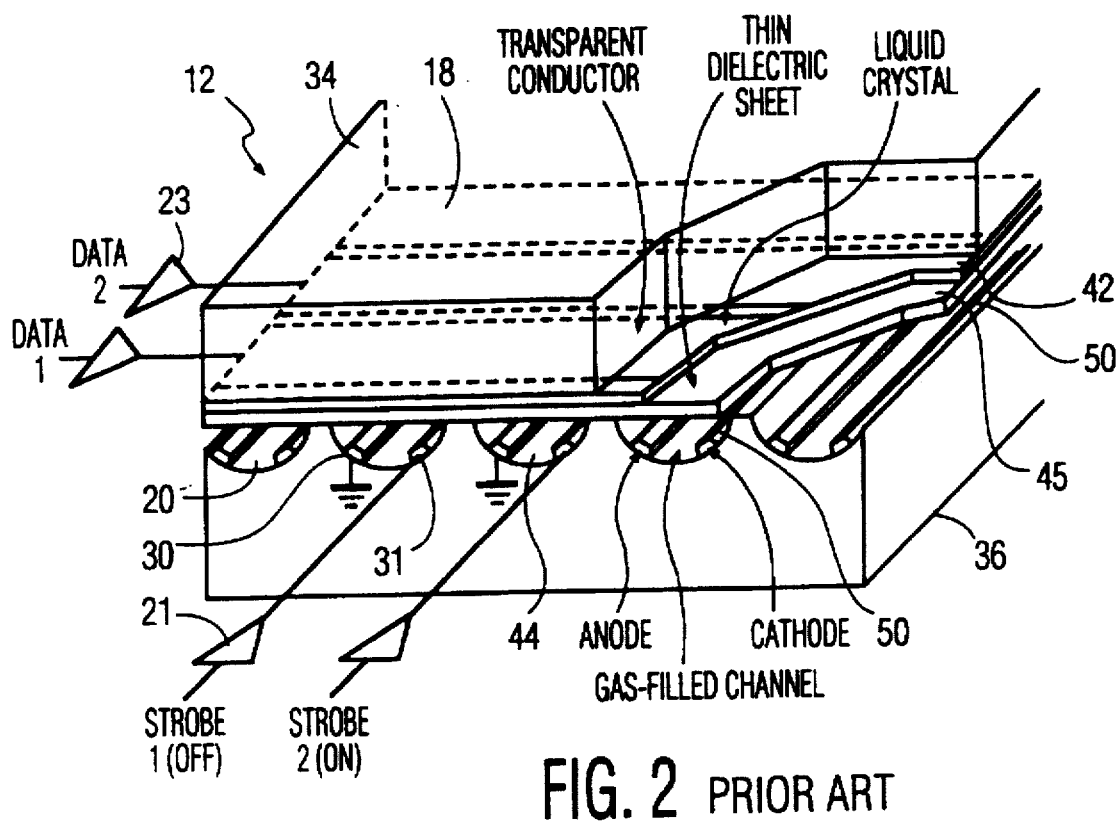
FIG. 2 is a perspective view of part of a conventional PALC display device.

FIG. 2 illustrates the PALC version of such a display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the cathode. The second electrode 31 is called the anode, became to it will be supplied relative to the cathode electrode a positive strobe pulse sufficient to cause electrons to be emitted from the cathode 30 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cross a whole column of pixels, only one plasma row connection at a time is allowed on to avoid crosstalk.

During operation, when a plasma is established in a channel, the cathode electrode 30 is bombarded with positive ions created in the plasma, commonly called sputtering, which evaporates material from the cathode electrode and erodes the cathode to the point where ignition of the plasma or maintenance of a stable plasma is hindered. As mentioned above, the commonly used Cr/Cu/Cr electrodes coated with a layer of $LaB_6$ or $GdB_6$ are subject to this sputtering problem. In addition, though the plasma can be switched on within a sufficiently short time by applying a sufficiently high strobe pulse, after termination of the strobe pulse, the plasma remains in a conducting state much longer (18 μs) than required.

In accordance with a feature of this invention, at least the cathode electrode of a PALC display channel is provided with a surface of a NEA material. In accordance with another feature of this invention, the NEA surface is provided on a conductive base by a thin film of a hard, refractory NEA material that has sufficient conductivity to support electron emission. A preferred material is a thin vapor-deposited conductive or semiconductive diamond or diamond-like carbon (DLC) film.

Figure 3:
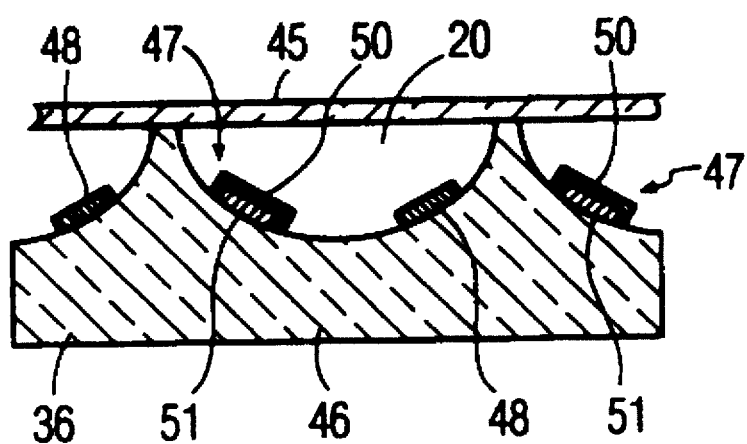
FIG. 3 is a cross-section of a channel of a PALC display device in accordance with the invention.

FIG. 3 illustrates just a substrate portion of the PALC display device containing the channels 20. The substrate 46, typically of glass, has the channels 20 etched as described in the referenced patents and publication, and the cathode 47 and anode 48 electrodes are typically vapor deposited. In accordance with the invention, a thin film of diamond or DLC 50 is provided over a cathode base 51 by vapor deposition. This construction will improve the switching properties of the plasma channel of the PALC display and without degrading its lifetime. Any electrode material which has sufficient conductivity and on which diamond or DLC thin films can be deposited can be used for the base 51. Examples are copper, aluminum and tungsten.

Diamond and DLC films are known to possess the property of negative electron affinity (NEA), and a high density of electron emission into vacuum has been demonstrated from diamond films at low electric fields. See, for example, F. J. Himpsel et al., Phys. Rev. B, Vol. 20, No. 2, Jul. 15, 1979. pp 20 624–20 626; N. Kumar et al., IEEE Colloq. on "Diamonds In Electronics And Optics", Digest No. 1993/204, 1993, pg. 1459. The use of NEA films such as diamond or DLC films will have several beneficial effects on the PALC display. The ignition voltage will be lowered, so that the strobe voltages required from the drive electronics can be lowered. The electron emission currents will be higher, so that the plasma can be established uniformly in a short time. The lower voltages needed and the hardness of these diamond and DLC films will make them more resistant to sputtering than the present materials. This will not only improve the performance, but also the reliability and lifetime of the PALC display. Moreover, the ruggedness of a diamond or DLC cathode surface will allow the use of different gas mixtures, such as He—Ne, so that the optimum gas mixture can be used without fear of degrading the lifetime or reliability of the PALC display.

A film with a conductivity of at least $10^{-4}$ mho/cm is preferred so that it is sufficiently electrically conductive to allow electrons to be conducted to the surface to replenish those emitted. Most diamond films have sufficient imperfections or inclusions, for example of graphite, which will make them sufficiently conductive to serve as cathode surfaces forestablishing a plasma. The better quality diamond films can be doped n-type to provide the conduction electrons to the surface. For example, diamond films can be made semi-conducting by doping with impurities as one would dope semiconductors, using for example impurities such as N, P or As which are co-vapor-deposited with the carbon atoms, or by using DLC films. DLC films naturally have graphite carbon inclusions which will provide a conduction path for electrons to the diamond crystallites which rest on the surface, as has been described in C. Wang et al., Electronics Letters, Aug. 1, 1991, Vol. 27, No. 16, pp. 1459–1461; and N. S. Xu et al., Electronics Letters, Sep. 2, 1993, Vol. 29, No. 18, pp. 1596–1597. The methods described in the above referenced publications describe in detail various ways of vapor-depositing thin films of such materials. All of the methods described will be suitable for making NEA surfaces that can serve as cathodes in an ionizable atmosphere. Due to the hardness of such materials and their resistance to sputtering, the films need not be particularly thick. Film thicknesses of at least 100Å are preferred to ensure adequate coverage of the cathode. Film thicknesses not exceeding 1 μm are preferred to ensure sufficient electron replenishment. Generally, only the cathode electrode need be coated with the diamond or DLC film, since it is the electrode required to emit electrons and is subject to the positive ion bombardment. However, the diamond or DLC films can be coated on the anode also, without any significant loss of performance, when of reasonable conductivity. This has the advantage that it can simplify the fabrication process of the display since both electrodes can thus be coated at the same time.

In addition to diamond or DLC films, other hard, refractory NEA materials of comparable properties can be used as coatings on top of the cathode electrode. One such material is AlN. The presence of an NEA surface has been demonstrated on AlN films grown heteroepitaxially on a conducting SiC substrates as described in M. C. Benjamin et al., Appl. Phys. Lett 64(24), Jun. 13, 1994, pp 3288–3290.

The channel gas filling can be the same as is used in previous PALC panels, or can be replaced by more desirable mixtures, such as He—Ne.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A plasma-addressed electro-optic display device comprising a layer of electro-optic material, data electrodes coupled to the electro-optic layer and adapted to receive data voltages for activating portions of the electro-optic layer, and a plurality of plasma channels extending generally transverse to the data electrodes for selectively switching on said electro-optic portions, said plasma channels each comprising spaced cathode and anode plasma electrodes and an ionizable gas filling, characterized in that the cathode electrodes have surface portions comprised of a negative electron affinity material having a conductivity of at least $10^{-4}$ mho/cm.

2. The device of claim 1, characterized in that the cathode electrodes each comprise a conductive base and a film of the negative electron affinity material on the base.

3. The device of claim 2, characterized in that the negative electron affinity, material film comprises a hard refractory conductive or semiconductive material.

4. The device of claim 1, characterized in that the negative electron affinity material film has a thickness of at least 100Å.

5. The device of claim 1, characterized in that the negative electron affinity material is diamond, diamond-like carbon, or aluminum nitride.

6. The device of claim 3, characterized in that the hard refractory material is diamond, diamond-like carbon, or aluminum nitride with a conductivity of at least $10^{-4}$ mho/cm.

* * * * *